US005991127A

United States Patent [19]
Thiessen

[11] Patent Number: 5,991,127
[45] Date of Patent: Nov. 23, 1999

[54] MAGNETIC HEAD AND TAPE PATH CLEANING TAPE

[75] Inventor: Jeffrey S. Thiessen, Champlin, Minn.

[73] Assignee: Geneva Group of Companies, Inc., Minneapolis, Minn.

[21] Appl. No.: 09/015,868

[22] Filed: Jan. 29, 1998

Related U.S. Application Data

[63] Continuation-in-part of application No. 08/700,793, Aug. 21, 1996, abandoned.

[51] Int. Cl.$^6$ .................................................. G11B 5/41
[52] U.S. Cl. .................................................. 360/128
[58] Field of Search .................... 360/128, 137; 15/DIG. 13

[56] References Cited

U.S. PATENT DOCUMENTS

| | | | |
|---|---|---|---|
| 4,138,229 | 2/1979 | Tadokoro et al. | 360/128 |
| 4,266,256 | 5/1981 | Kato et al. | 360/128 |
| 4,408,241 | 10/1983 | Ogawa | 360/128 |
| 4,661,874 | 4/1987 | Buehl et al. | 360/128 |
| 4,701,364 | 10/1987 | Miyoshi et al. | 428/141 |
| 4,864,351 | 9/1989 | Imai et al. | 360/128 |
| 4,928,189 | 5/1990 | Siddiq | 360/128 |
| 5,012,377 | 4/1991 | Siddio | 360/128 |
| 5,363,267 | 11/1994 | Fang | 360/128 |
| 5,463,519 | 10/1995 | Dodt et al. | 360/128 |
| 5,632,668 | 5/1997 | Lindholm et al. | 451/42 |

FOREIGN PATENT DOCUMENTS

| | | | |
|---|---|---|---|
| 61-192015 | 8/1986 | Japan | 360/128 |
| 61-192016 | 8/1986 | Japan | 360/128 |
| 61-192017 | 8/1986 | Japan | 360/128 |
| 4-155610 | 5/1992 | Japan | 360/128 |
| 5-2722 | 1/1993 | Japan | 360/128 |
| 5-28477 | 2/1993 | Japan . | |
| 6-243440 | 9/1994 | Japan | 360/128 |
| 7-205036 | 8/1995 | Japan . | |
| 8-30930 | 2/1996 | Japan . | |
| 2152268 | 7/1985 | United Kingdom | 360/128 |

*Primary Examiner*—Jefferson Evans
*Attorney, Agent, or Firm*—Moore & Hansen

[57] ABSTRACT

A cleaning tape for cleaning a magnetic tape head and tape path, having a non-abrasive cleaning surface with abrasive segments applied on the non-abrasive surface to form an alternating pattern. The abrasive segments may be angled across the surface of the non-abrasive cleaning surface. The abrasive segments loosen adhered debris and the non-abrasive segments carry the loose and loosened debris away from the head and the tape path.

21 Claims, 2 Drawing Sheets

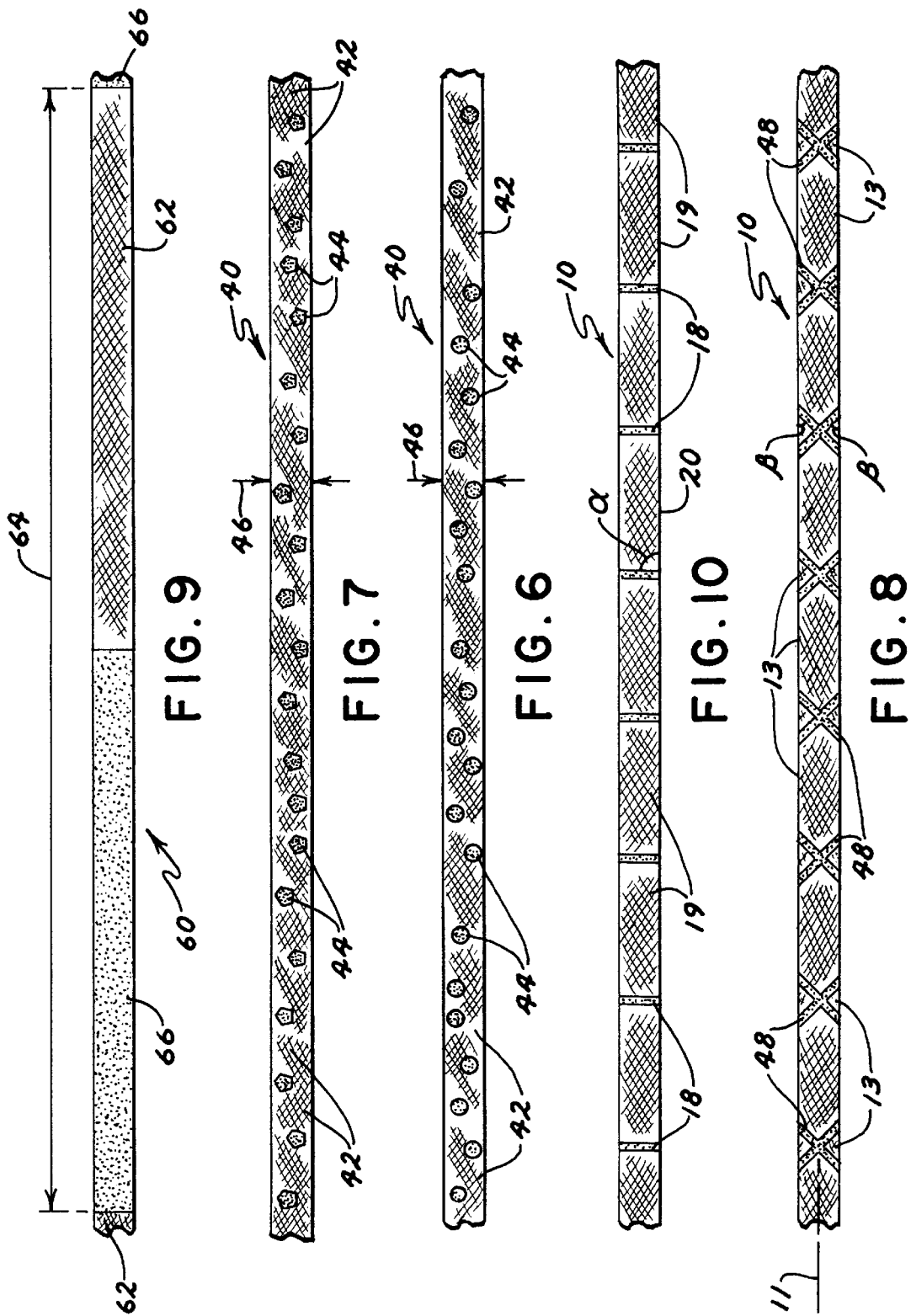

MAGNETIC HEAD AND TAPE PATH CLEANING TAPE

This is a continuation-in-part of application Ser. No. 08/700,793, filed Aug. 21, 1996, now abandoned.

BACKGROUND OF THE INVENTION

The present invention relates generally to cleaning tapes, and specifically to cleaning tapes for cleaning magnetic tape heads.

There are two basic types of cleaning tapes used to clean magnetic tape heads of audio cassette decks and players, video cassette recorder heads, read/write heads of computer drives, and the like. The two types of cleaning tapes are abrasive and non-abrasive. The abrasive cleaning tapes use an unpolished or uncalendared magnetic tape media or an abrasive coating on a polyester base to lap or sand debris off of a head. Abrasive tapes do not have the ability to remove loose debris from the tape head. In harsh environments where many magnetic tape heads are located, such as areas where dust, saw dust, wood chips, and other debris and particulate matter may be in the air, abrasive tapes serve only to lap, sand, or loosen debris off of the head. Carrying away of the debris from the bead is not accomplished using an abrasive cleaning tape. In areas such as a machine shop, wood shop, or any area where a magnetic tape head may be located in which the environment contains free floating particles or debris, an abrasive cleaning tape will not be able to carry debris away from the tape head. Further, abrasive cleaning tapes tend to aggressively wear the head, shortening the life span of the head.

The non-abrasive type of cleaning tape is able to carry loose debris and particles away from the tape head and tape path. Non-abrasive cleaning tapes use a non-abrasive substance as a cleaning medium. Non-abrasive cleaning media include woven or non-woven nylon, non-woven polyester, woven silk, tyvek, and the like. Non-abrasive cleaning tapes can loosen some debris from a tape head. However, non-abrasive cleaning tapes are not able to effectively loosen debris which may adhere or affix itself to the tape head, such as organic polymers, known as brown stain, and heavy deposits of debris. Over time, oxide particles and the like become affixed to the tape head, degrading performance, unless they are removed. A non-abrasive cleaning tape, while it can remove loose debris, cannot effectively loosen all debris from the head.

It would be desirable to provide a cleaning tape that could not only loosen debris from the tape head, but could also remove loose debris and particles from the tape head and path, especially the particles or debris that it has just removed from the tape head.

It would also be desirable for such a cleaning tape to not aggressively or excessively wear the head.

SUMMARY OF THE INVENTION

The present invention overcomes the problems of the prior art by providing a cleaning tape for a magnetic tape head which contains alternating segments of abrasive and non-abrasive surfaces. Such a cleaning tape not only loosens debris from the tape head, but also removes the loose debris, as well as other debris that may be in the area of the tape head or tape path.

The cleaning tape of the present invention uses a substrate base material of woven nylon. An abrasive material is applied to the front surface of the nylon base material in spaced apart segments. A barrier coating may be applied to the substrate on the opposite side as the abrasive coating to allow greater efficiency in the manufacturing process. The barrier coating also serves to prevent the abrasive material from bleeding through the substrate. Additionally, the barrier may be applied as an opaque barrier, which would allow for recognition of the cleaning tape by the drive.

The abrasive material used in the present invention is Aluminum oxide. Other abrasive materials may be used, provided that they may be printed onto the woven nylon substrate. The abrasive coating segments may be arranged in a variety of patterns, and the abrasive sections may be separated by exposed nylon substrate segments of a variety of widths.

The present invention reduces the head wear associated with purely abrasive cleaning tapes while still loosening debris from the head. The present invention also carries away the loosened material.

Additional patterns of segments, either ordered or somewhat random, may be applied to the cleaning substrate without departing from the scope of the invention. Such patterns include but are not limited to circular applications of abrasive material either in an ordered pattern or randomly spaced apart, applications of other shapes of abrasive material with ordered or random placement, or X-shaped spaced apart segments with the pattern extending from an outer edge of the flexible base substrate to the opposite edge thereof. Another variation of cleaning tape embodies a series of cleaning lengths along a cleaning tape, with each cleaning length comprising half non-abrasive material such as woven nylon and half abrasive material, with the materials being distributed equally in two segments, one abrasive and one non-abrasive.

These and other benefits of the present invention will become apparent from the following detailed description thereof taken in conjunction with the accompanying drawings, and wherein like reference numerals designate like elements about the several views.

DESCRIPTION OF THE DRAWINGS

FIG. 6 is a top view of another alternative abrasive application pattern of the present invention;

FIG. 7 is a top view of another alternative abrasive application pattern of the present invention;

FIG. 8 is a top view of an alternative abrasive segment pattern of the cleaning tape embodied in FIG. 1;

FIG. 9 is a top view of an alternative embodiment of the cleaning tape of the present invention showing a cleaning length of half abrasive material and half non-abrasive material; and FIG. 10 is a top view of an alternative abrasive segment pattern of the present invention.

DESCRIPTION OF THE PREFERRED EMBODIMENT

Figure 1:
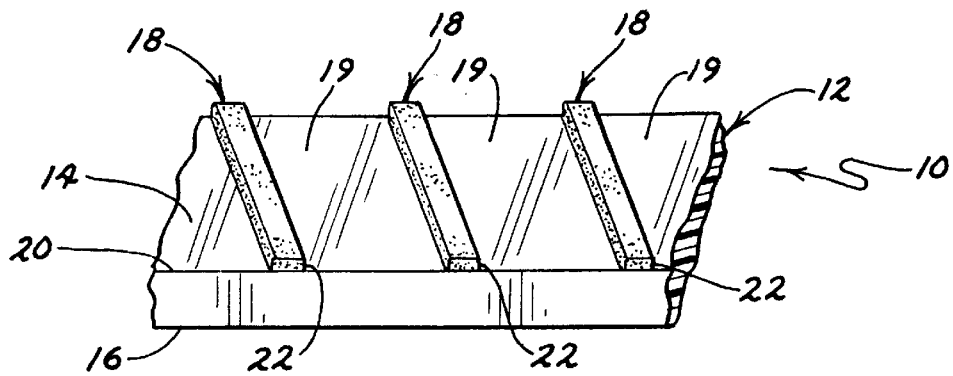
FIG. 1 is a perspective view of an embodiment of the cleaning tape of the present invention.

Referring now to FIG. 1, a length of cleaning tape 10 may be seen. Cleaning tape 10 has a nylon substrate 12 which is used as a base for the cleaning tape 10. Nylon substrate 12 has front surface 14 and back surface 16. A plurality of abrasive segments 18 are applied to front surface 14, creating an alternating pattern of abrasive segments 18 and exposed non-abrasive segments 19. Abrasive segments 18 are preferably Aluminum oxide, but other abrasives may be employed to the same effect. Such other abrasives include but are not limited to Chromium oxide, Cerium, diamond, and ferric oxide.

Figure 3:
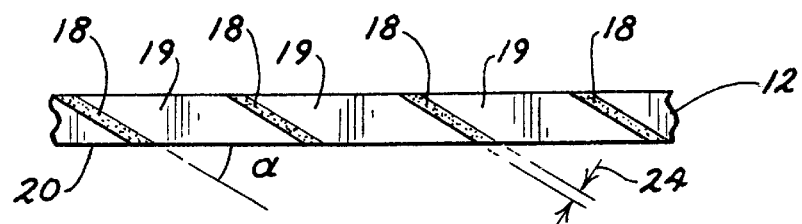
FIG. 3 is a top view of the embodiment of FIG. 1.

Referring now to FIG. 3, a top view of the cleaning tape 10 of FIG. 1 may be seen. Abrasive segments 18 are applied to the substrate 12 at an angle α with respect to the edge 20 of substrate 12. The abrasive segments 18 are applied at an angle to lessen the impact of the abrasive segments 18 on the magnetic head which is being cleaned.

The abrasive segments 18 are printed onto the substrate 12 by known printing methods. The preferred abrasive material, Aluminum oxide, is mixed with a phenolic resin, or binder, to make a dispersion. This dispersion is printed onto the substrate 12 in a normal printing process. Heat curing solidifies the dispersion.

When the phenolic resin/Aluminum oxide dispersion cures to leave the hardened abrasive segments 18 on the substrate 12, an edge or lip 22 is left behind. This edge or lip 22 is the first part of each abrasive segment 18 to contact the head, which may be spinning in excess of 2000 revolutions per minute. The larger the angle α, the greater the impact of lips 22 on the magnetic head. At an α of 90 degrees, (FIG. 10), the edge or lip 22 has the greatest impact on the magnetic head. Since the abrasive segments will cause the head to wear, it is desirable to minimize the amount of contact the abrasive segments 18 have with the head, especially when the impact on the head is great. Therefore, the abrasive segments are preferably disposed at an angle. This disposition lessens the impact of the abrasive segment lips 22 on the head by providing a gentler introduction of the segment 18 to the head. It has been found that an angle α of approximately 30 degrees provides the balanced benefits of an abrasive cleaning tape segment without the detrimental effects of overaggressive abrasion. If more or less aggressive cleaning tapes are desired, the angle α may be increased or decreased accordingly.

Alternatively, uncalendared magnetic media may be used to form abrasive segments such as segments 18. Uncalendared magnetic media is unpolished, and therefore provides an abrasive quality if used as a segment such as segment 18. The uncalendared magnetic media may be applied to substrate 12 in conventional fashion.

Woven nylon is the preferred material for substrate 12. Woven nylon has a predetermined pattern of fiber arrangement. The fiber distribution is organized. This organization helps the exposed segments 19 of woven nylon to carry away loose particles from the tape head and tape path. Non-woven nylon, although it may be used, is not preferred since non-woven nylon has a random pattern. This random pattern leads to shedding of filaments, which may necessitate further cleaning to remove shedded filaments. Woven nylon is also preferred for substrate 12 since woven nylon is available in a variety of thread densities, which allows for changing of the stiffness of the tape 10 to better match the contours of a magnetic tape head that is to be cleaned.

The abrasive segments 18 are spaced apart along the substrate 12 as shown in the figures. The spacing of the segments 18 also contributes to the overall aggressiveness of the cleaning tape 10. The greater the percentage of cleaning tape 10 that is abrasive, the greater the wear on the tape head.

If too much of the cleaning tape 10 is abrasive, excessive head wear will result. Nylon and woven nylon do not contribute to head wear. It has been found that abrasive segments 18 will provide effective loosening of particles and debris affixed to the head, yet lessen head wear, if the segments are applied at a width 24 of approximately one sixteenth of an inch, and are separated by exposed non-abrasive segments 19 of approximately one and one eighth inches. As with the angle α of the abrasive segments 18, the spacing and widths of the abrasive segments 18 and the exposed non-abrasive segments 19 may be changed to affect the overall aggressiveness of the cleaning tape 10.

Figure 2:
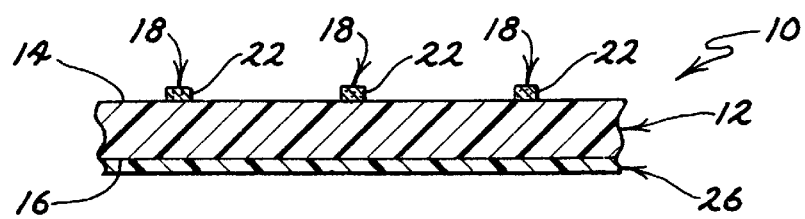
FIG. 2 is a section view of an alternative embodiment of the present invention.

Referring to FIG. 2, an alternative configuration for the cleaning tape 10 is shown. The only difference in the configuration of FIG. 2 and that of FIG. 1 is the addition of a barrier coating 26 applied to the back surface 16 of the substrate 12. The addition of a barrier coat 26 on the back surface 16 could give additional attributes to the present invention by helping to create an air bearing which allows better contouring of the head by reducing friction. Further, the addition of a barrier coating 26 could allow for more efficiencies in the manufacturing process. If such a barrier coating 26 is applied, the preferred material is polyurethane, but other materials having similar properties could also be employed.

The barrier coating 26 also serves several other purposes. Many tape drives contain optical sensors to identify the beginning and end of a tape. These optical sensors are keyed to clear or transparent leaders used at the beginning and end of tapes. Some tape drives use recognition holes to determine the presence of a cleaning tape. Others use the optical sensors. The barrier coating 26 may be applied as an opaque coating. This opaque coating can trigger a drive's recognition of the cleaning tape 10 as a cleaning tape, eliminating the need for a mechanical system for defeating the sensors.

Further, the barrier coating 26 will prevent the dispersion from bleeding through the substrate 12, which may degrade the performance of cleaning tape 10.

Figure 4:
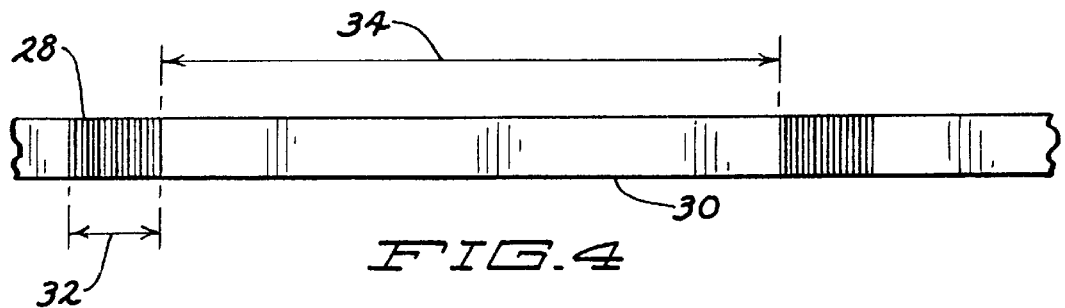
FIG. 4 is a top view of an alternative abrasive segment pattern of the present invention.

Referring now to FIG. 4, an alternative embodiment of the configuration of alternating abrasive segments 28 and non-abrasive segments 30 is shown. In this configuration, the abrasive segment width 32 is approximately one half inch, and the spacing 34 between abrasive segments 18 is approximately six inches.

Figure 5:
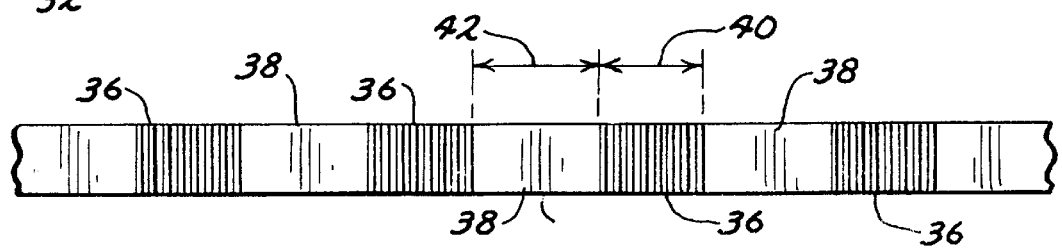
FIG. 5 is a top view of another alternative abrasive segment pattern of the present invention.

FIG. 5 shows yet another alternative configuration for alternating abrasive segments 36 and non-abrasive segments 38. In this configuration, the abrasive segment width and the nonabrasive segment width is approximately the same, with both widths being approximately one half inch.

The cleaning tape 10 therefore loosens debris from a tape head without excessively wearing the head, by using abrasive segments 18. Alternating non-abrasive segments 19 serve to carry away loose and loosened debris from both the tape head and the tape path.

Yet another alternative embodiment 40 of the cleaning tape is shown in FIG. 6. Cleaning tape 40 is shown with a flexible base substrate 42 made of woven nylon or other suitable non-abrasive material. A plurality of spaced apart locations on the substrate 42 have applied or attached thereto abrasive material 44 in the form of a dispersion or uncalendared magnetic media, as have both been described above. These locations or sections 44 of abrasive material may be disposed in an ordered pattern along the substrate 42, or spots or sections 44 may be arranged in a random pattern. The spots or sections 44 are preferably applied so that all of the area along the width 46 of substrate 42 is covered with approximately equal coverage along the cleaning length of the cleaning tape 40.

As is shown in FIGS. 6 and 7, the spots or sections 44 may be of a variety of different shapes. FIG. 6 shows spots 44 applied in a circular pattern, and FIG. 7 shows pentagonal shaped spots or sections 44. As should be understood, the spots or sections need not be ordered or arranged in any specific pattern, nor do the spots for sections 44 need to be identical to each other. Spots or sections 44 of different shapes and sizes may be applied either in a random or an ordered pattern along the cleaning length of a cleaning tape 40 without regard to their shape, provided that the spots or sections 44 provide abrasive material coverage at some point along the cleaning length of the entire width 46 of cleaning tape 40. This is to ensure that a cleaning tape 40 with the random or ordered arrangement of spots or sections 44 along its flexible base substrate 42 will provide adequate abrasive cleaning coverage for the head of a magnetic tape drive which is being cleaned by cleaning tape 40.

Referring to FIG. 8, an alternative pattern of abrasive material segments may be seen on cleaning tape 10. The segments 48 are in the form of an X, with the pattern crossing in the middle 11 of the cleaning tape 10. The dual crossing segments each provide an angular interface β between the tape head and the abrasive material on the cleaning tape 10, and provide additional non-abrasive portions 13 of cleaning tape 10 to carry away debris that may be loosened by the abrasive segments 46. The angle β of the segments with respect to edge 20 of cleaning tape 10 may be varied depending on the degree of aggressiveness of cleaning desired for the tape 10. The larger the angle β, the more aggressive head wear will be. The angles β need not be equal for the crossing segments, but preferably are equal for consistent cleaning and head wear.

Referring now to FIG. 9, another alternative embodiment 60 of a cleaning tape is shown. Cleaning tape 60 has a base substrate 62 of material as in cleaning tapes 10 and 40. Cleaning tape 60 has a cleaning length 64 which is approximately half non-abrasive substrate 62 and approximately half abrasive section 66. Abrasive section 66 may be an abrasive dispersion or uncalendared magnetic media as described above. The cleaning length 64 of tape 60 is divided into two substantially equal sections 62 and 66. A plurality of cleaning lengths 64 may be wound into one cleaning cassette for ease of use.

In operation a cleaning tapes such as cleaning tape 10, 40 or 60 will be drawn across the magnetic tape drive head which is to be cleaned. Segments or portions of the cleaning tape 10, 40 or 60 will be abrasive, and other segments or sections of the cleaning tape 10, 40 or 60 will be non-abrasive, with the net effect being a pattern which allows for both abrasive and non-abrasive portions of the cleaning tape 10, 40 or 60 passing across the tape head to be cleaned.

The detailed description outlined above is considered to be illustrative only of the principals of the invention. Numerous changes and modifications will occur to those skilled in the art, and there is no intention to restrict the scope of the invention to the detailed description. The preferred embodiment having been described in detail, the scope of the invention should be defined by the following claims.

What is claimed is:

1. A cleaning tape for cleaning a magnetic tape head comprising:

a flexible base substrate of woven nylon having opposed front and back surfaces, said front surface comprising a cleaning surface;

a plurality of spaced apart abrasive segments of a different material printed on said front surface along the length thereof to thereby provide alternate abrasive segments and exposed substrate, cleaning segments on said front surface.

2. A cleaning tape as described in claim 1 wherein said abrasive segments have a longitudinal dimension along the length of said substrate which is less than the length of each segment of exposed substrate between consecutive abrasive segments.

3. A cleaning tape as described in claim 1, and further comprising:

a barrier coating applied to said back surface of said substrate.

4. A cleaning tape as described in claim 3, wherein said barrier coating is polyurethane.

5. A cleaning tape as described in claim 1, wherein said abrasive segments are aluminum oxide.

6. A cleaning tape as described in claim 1, wherein said substrate is nylon.

7. A cleaning tape as described in claim 1, wherein said substrate is woven nylon.

8. A cleaning tape as described in claim 1, wherein said abrasive segments are applied at an angle with respect to longitudinal edge of said substrate across the width of said substrate front surface.

9. A cleaning tape as described in claim 8, wherein the angle is in the range of 20–40 degrees.

10. A cleaning tape as described in claim 8, wherein said angle is approximately 30 degrees.

11. The cleaning tape of claim 8, wherein said angle is substantially 90 degrees.

12. A cleaning tape as described in claim 1, wherein said abrasive segments have the same longitudinal width as the exposed substrate segments on said front surface.

13. A cleaning tape as described in claim 1, wherein said abrasive segments are separated by a longitudinal distance of exposed substrate which is approximately six times the width of said abrasive segments.

14. The cleaning tape of claim 1, wherein said abrasive portions are substantially circular in shape.

15. The cleaning tape of claim 1, wherein said abrasive portions are pentagonal in shape.

16. A cleaning tape for cleaning a magnetic tape head comprising:

a flexible base substrate having opposed front and back surfaces, said front surface comprising a cleaning surface;

a plurality of spaced apart abrasive segments of a different material applied to said front surface along the length thereof to thereby provide alternate abrasive segments and exposed substrate, cleaning segments on said front surface said abrasive segments having a longitudinal length of approximately six hundredths of an inch; and said exposed segments of substrate having a longitudinal length of approximately 1⅛ inch.

17. A cleaning tape for cleaning a magnetic tape head comprising:

a flexible base substrate strip of woven nylon, having opposed front and back surfaces;

a plurality of spaced apart abrasive segments of aluminum oxide applied to said front surface along the length thereof to thereby provide alternate abrasive segments and exposed nylon substrate segments on said front surface.

18. A cleaning tape as described in claim 17, and further comprising:

a barrier coating applied to said back surface of said substrate to prevent material from bleeding through said substrate.

19. A cleaning tape as described in claim 18, wherein said barrier coating is polyurethane.

20. The cleaning tape of claim 17 wherein said abrasive segments are applied to said substrate using a printing step.

21. A cleaning tape for cleaning a magnetic tape head comprising:

a flexible base substrate having opposed front and back surfaces, said front surface comprising a cleaning surface;

a plurality of spaced apart abrasive segments of a different material applied to said front surface along the length thereof to thereby provide alternate abrasive segments and exposed substrate, cleaning segments on said front surface said abrasive segments being uncalendered magnetic media having two segment legs arranged in a pattern such that said legs cross one another near the center of said cleaning surface, said segment legs extending from one edge of said substrate to the other edge of said substrate, the segment legs forming an X pattern.

* * * * *